United States Patent [19]

Iida

[11] Patent Number: 4,525,242
[45] Date of Patent: * Jun. 25, 1985

[54] DESALTING SYSTEM UTILIZING SOLAR ENERGY

[76] Inventor: Tomimaru Iida, 5-20-11, Todoroki, Setagaya-ku, Tokyo, Japan

[*] Notice: The portion of the term of this patent subsequent to Mar. 9, 1999 has been disclaimed.

[21] Appl. No.: 396,827

[22] Filed: Jul. 9, 1982

[30] Foreign Application Priority Data

Jul. 31, 1981 [JP] Japan ................ 56-119235

[51] Int. Cl.³ ............................ C02F 1/06; C02F 1/14
[52] U.S. Cl. .................................... 202/177; 202/173; 202/180; 202/235; 203/11; 203/22; 203/100; 203/DIG. 1; 203/DIG. 4; 203/DIG. 14; 203/DIG. 20
[58] Field of Search .......... 203/DIG. 1, 49, DIG. 14, 203/100, DIG. 4, 10, 11, 25, 26, 22, 24, DIG. 16, 88, DIG. 20; 202/234, 233, 235, 177, 180, 173, 174, 175, 176, 205, 265, 166; 126/435, 438, 424; 159/15

[56] References Cited

U.S. PATENT DOCUMENTS

| | | | |
|---|---|---|---|
| 1,466,670 | 9/1923 | Monti | 203/DIG. 4 |
| 1,954,949 | 4/1934 | Roe | 252/70 X |
| 2,038,724 | 4/1936 | Eichengrün | 252/70 X |
| 3,394,054 | 7/1968 | Hoham . | |
| 3,607,756 | 9/1971 | Phillips | 252/70 X |
| 3,699,006 | 10/1972 | Hasslacher | 203/DIG. 4 |
| 4,235,678 | 11/1980 | McKeen | 203/DIG. 4 |
| 4,308,106 | 12/1981 | Mannfeld | 203/DIG. 4 X |
| 4,318,781 | 3/1982 | Iida | 202/173 |
| 4,373,996 | 2/1983 | Maruko | 202/173 |
| 4,444,623 | 4/1984 | Youngner | 203/26 X |

*Primary Examiner*—Wilbur Bascomb
*Attorney, Agent, or Firm*—Birch, Stewart, Kolasch & Birch

[57] ABSTRACT

A heat-transfer medium is heated by a solar heat collector and then adiabatically compressed. The heat-transfer medium thus compressed exchanges heat with the seawater to heat it, and is then adiabatically expanded with the heated seawater being evaporated and the steam thus produced, upon heat exchange with the seawater, changed into fresh water.

5 Claims, 5 Drawing Figures

DESALTING SYSTEM UTILIZING SOLAR ENERGY

BACKGROUND OF THE INVENTION

This invention relates to a desalting system utilizing solar energy as a source of heat.

The utilization of inexhaustible solar energy in place of fossil fuels, such as oil and coal limited in their reserves, is proposed in many fields and has already been put to practical use in some fields. Also in the field of the desalting art, some desalting systems utilizing solar heat have been proposed instead of the conventional multistage flash method using fossil fuels. Applicant has proposed several systems for example as disclosed in Japanese Patent Publication Nos. 3077/79, 36150/79 and 3793/81. Most of such proposed desalting systems adopt a fixed type of solar heat collector to heat seawater, so that the cost required for equipment and operation is not too high, but the amount of heat to be collected depends on the position of the sun, and particularly during the morning and evening when the position of the sun is relatively low, the amount of collected heat is small, and therefore, the temperature of seawater heated by the solar heat collectors is generally below 100° C. For the above reasons, it may be necessary for the temperature of the seawater to be further increased by additionally heating by means of fossil fuels, or a decompression device such as a bleeding ejector, used.

Thus, to improve the amount of collected solar heat, a system has been proposed in which tracking type of heat collectors are used in such a way that their heat collecting planes are moved according to the movement of the sun in a day. According to this system, seawater can be heated directly or through some heat-transfer medium above 100° C. For that purpose, however, it is required that concentrating type of heat collectors are used in such a way that the mirrors thereof are properly directed to the sun, each of the mirrors being provided with a respective tracking means, and the heat collectors are arranged together as a whole. Therefore, such a system becomes a considerably large-scale, and hence the cost for construction, operation and maintenance of the system will become enormous.

SUMMARY OF THE INVENTION

In light of the above discussion and considering that the higher the temperature of seawater, the higher is the efficiency of desalting, the present invention provides a desalting system such that the construction is not so complex and which allows the temperature of seawater to be raised by utilizing only solar energy. In this system, a heat-transfer medium heated by solar energy is adiabatically compressed to raise its temperature to at least 130° C. and preferably, to 150° to 160° C. or more. The heated heat-transfer medium thereafter exchanges heat with seawater, thereby distilling seawater at 120° C.

BRIEF DESCRIPTION OF THE DRAWINGS

The invention will be described by reference with the accompanying drawings in which.

DETAILED DESCRIPTION OF THE PREFERRED EMBODIMENT

Figure 1:
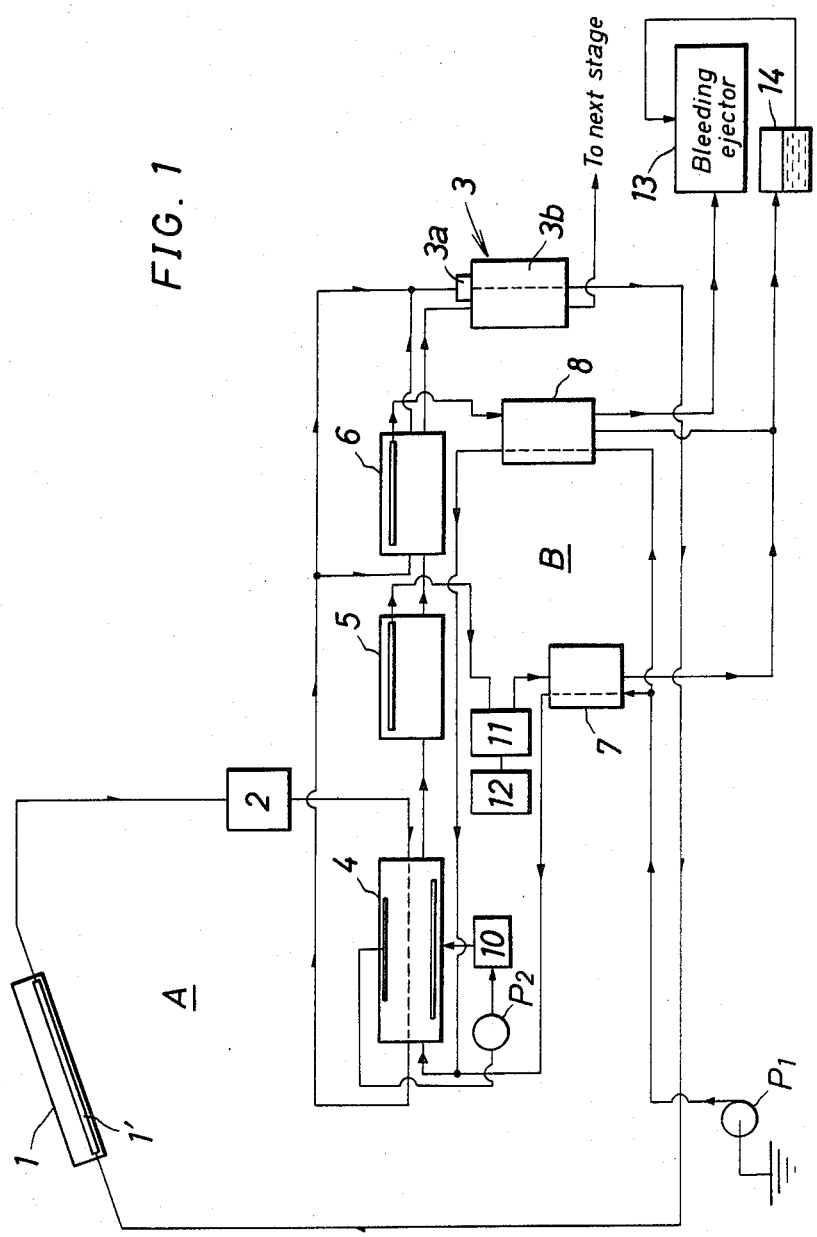
FIG. 1 is a flow diagram of an embodiment of a desalting system in accordance with the present invention.

While FIG. 1 shows a flow diagram of a desalting system in accordance with the invention, in which for the present convenience of explanation only one distilling stage is shown, a plurality of stages consisting of the same configuration may be connected in series or parallel, if desired.

The illustrated desalting system consists of a heat collecting circuit A and a distillation circuit B, wherein the path of a heat-transfer medium flowing through the circuit A is shown by arrows ⟶ and the path of seawater and fresh water including steam flowing through the circuit B by arrows →.

The circuit A comprises a fixed type of solar heat collector 1, a compressor 2, and an expansion apparatus 3, the solar heat collector 1 being provided with a heat collecting pipe or plate 1' therein and the heat-transfer medium being heated by solar energy when it passes through the heat plate 1'. The compressor 2 compresses adiabatically the heat-transfer medium heated by the heat collector 1 (the term "adiabatic compression" in this case is somewhat different in its meaning from the thermodynamic "adiabatic compression"). The expansion apparatus 3 comprises an expansion chamber 3a which causes the adiabatic expansion of the heat-transfer medium flowing out of a heat exchanger 4, to be described hereinafter, after heat exchange and a heat exchanger 3b, in which the heat-transfer medium cooled through the adiabatic expansion in the expansion chamber 3a, absorbs heat from seawater.

For the heat-transfer medium of the present invention circulating through the heat collecting circuit A, preferred are those having low boiling points and relatively large values of heat of vaporization, and desirably, for example, Freon and alcohol, but there are other available materials which are organic or inorganic materials or elements, such as heptane, water and Flutec PP2.

Figure 2:
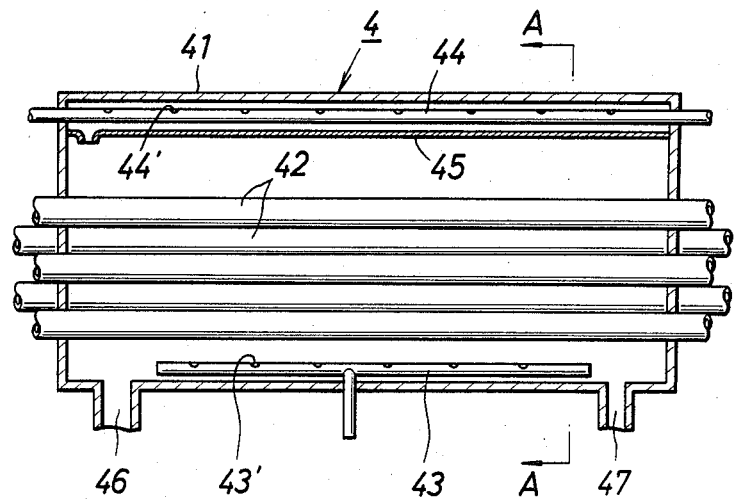
FIG. 2 is a longitudinal sectional view of a heat exchanger used in the desalting system shown in FIG. 1.
Figure 3:
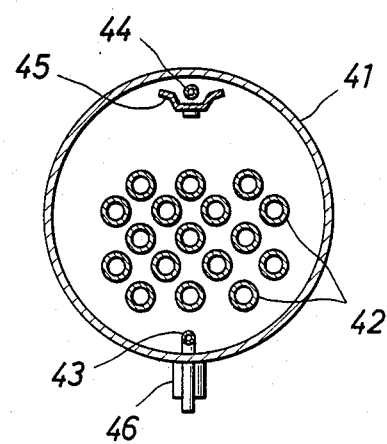
FIG. 3 is a cross sectional view taken along the line A—A of FIG. 2.
Figure 4:
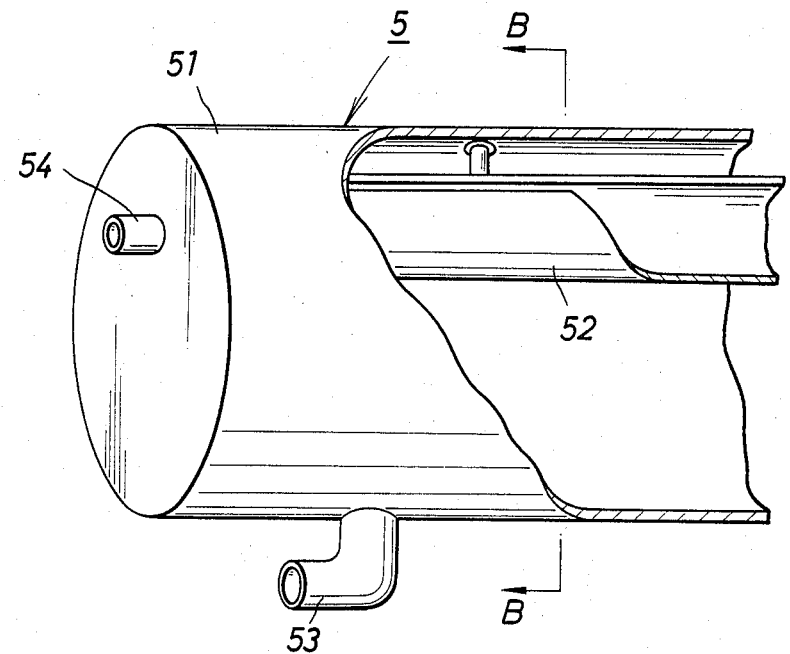
FIG. 4 is a partially broken perspective view showing a Still used in the desalting system.
Figure 5:
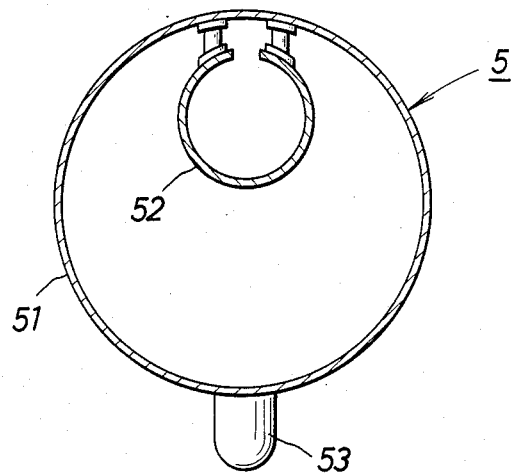
FIG. 5 is a cross sectional view taken along the line B—B of FIG. 4.

The distilling circuit B consists of the heat exchanger 4, stills 5 and 6, and steam condensing heat exchangers 7 and 8, the heat exchanger 4 exchanging heat between the seawater and the heat-transfer medium adiabatically compressed by the compressor 2 in the heat collecting circuit A. The structure of heat exchanger 4 is shown in detail in FIGS. 2 and 3, in which a number of heat exchanging pipes 42 constituting a part of the heat collecting circuit A are disposed at the inner and lower part of outer tube 41 and an air blowing pipe or sparger 43 for blowing compressed air into the outer tube 41 is disposed below the heat exchanging pipes 42 or in a proper place among the heat exchanging pipes 42, and in the inner and upper part of outer tube 41 is disposed an air release pipe 44 immediately under which a seawater blocking plate 45 is positioned. The air blowing pipe 43 and the air release pipe 44 have openings 43' and 44' formed at regular intervals along their length, respectively. Nearby the ends of the outer tube 41 are provided a seawater intake 46 and a seawater outlet 47. Preferably, the heat exchange pipes 42 are made of a seawater resistant metal because the gaseous heat-transfer medium, a part of which is liquid at 130° C. or more, flows through the inner part thereof and seawater at 40° to 120° C. makes contact with the outer surface thereof; and, for example, corrosion resistant alloys such as Everbrass (trademark), cupronickel, and titanium are used. To improve the efficiency of heat exchange between the heat-transfer medium and the seawater, means may be employed for positively making the flow of the heat-transfer medium into turbulent flow by forming a helical fin along the inner surface of the heat exchange pipe 42 or by inserting twisted metal strips into the pipe. As another means to improve the heat exchange efficiency, agitation is used caused by blowing compressed air into the seawater from openings 43' of the air blowing pipe 43 to cause the surface of the heat exchanging pipes 42 to be cleaned by bubbles colliding with the surface thereof. This effect of agitation by bubbles makes the heat transfer characteristic of the heat exchange pipes 42 far better than that for laminar flow, the heat transfer coefficient of the pipes 42 being improved by two to three times. Air blowing pipe 43, air release pipe 44 and seawater blocking plate 45 are preferably made of glass such as Pyrex glass or heat resistant materials such as hot-seawater resistant metals as previously described. Furthermore, if the outer tube 41 is of a Hume pipe (trademark), it is desirable to lay, for example, a net of glass fiber on the inner surface thereof, and then cover the net with an adhesive and highly chemical resistant resin such as epoxy resin. The air blowing pipe 43 is connected to a compressed air source 10, and a connecting conduit therebetween may be served by that made of stainless steel, which is inexpensive. The stills 5 and 6 are portions for evaporating seawater heated in the main heat exchanger 4 to produce steam. Because the structure thereof has already been described in detail in Japanese patent application No. 124393/76, the detailed description of the structure is omitted herein. Briefly, as shown in FIGS. 4 and 5, the stills 4 and 6 each have an antipriming pipe 52 disposed in the inner and upper part of a concrete-made outer pipe 51. The outer pipe 51 is provided with a seawater inlet (not shown), and also of course, with the steam outlet 54 from the antipriming pipe 52. The antipriming pipe 52 for the still 5 is connected to a power generating turbine 11, which will be described hereinafter, while the antipriming pipe 52 for the still 6 is connected and decompressed to a bleeding ejector 13 through the steam condensing heat exchanger 8.

The steam condensing heat exchanger 7 produces fresh water by carrying out heat exchange between the steam from the turbine 11 and seawater, while the steam condensing heat exchanger 8 converts steam obtained from the antipriming pipe 52 into fresh water also by cooling the steam by seawater, while the seawater is heated. Either heat exchanger may be of a conventional type.

In this embodiment, in addition to the heat collecting circuit A and the distilling circuit B, there are provided a power generating turbine 11 utilizing steam produced by the still 5 and an electric generator 12, and a freshwater pool 14 for storing fresh water.

The above described desalting system will be operated as follows:

The heat-transfer medium is heated by solar energy when it passes through the heat collecting plate 1' in the heat collector 1 during circulation through the heat collecting circuit A, leaving from the outlet of the heat collector 1 as gas at about 60° to 80° C. This heat-transfer medium is heated to about 160° C. by adiabatic compression by means of the compressor 2. The resulting high temperature heat transfer medium in the form of a super heated vapor, for example, is led to the heat-exhange pipes 42 of the heat exchanger 4.

On the other hand, seawater pumped up from the sea by a pump $P_1$ is heated to about 40° C. through the heat exchanger 7 and introduced from the seawater intake 46 into the heat exchanger 4 where the seawater is heated to about 120° C. by the high temperature heat-transfer medium, such as superheated vapor. At this time, forced from the openings 43' of the air blowing pipe 43 into the seawater is compressed air, for example, at about 2 atm. supplied from the compressed air source 10. The seawater is agitated by the air blown thereinto and exchanges heat efficiently with the high temperature heat-transfer medium flowing through the heat exchanging pipes 42. This effect of agitation and cleaning of the surface of the pipes by bubbles causes a heat transfer coefficient to be rapidly increased, thereby contributing largely to the improvement in the thermal efficiency of the overall system. The number of openings 43' in the air blowing pipe 43, the area of each of the openings 43', and the pressure of compressed air are determined in consideration of the scale of the system, particularly the flow rate of seawater to be subjected to heat exchange. Air blown into the seawater is upwardly released from the surface of seawater after completing its bubble agitating action and then taken in from the openings 44' of the air release pipe 44 disposed above the outer tube 41 to be discharged to the outside of heat exchanger 4. The discharged air is circulated by a pump $P_2$, as shown in FIG. 1. Additionally, a seawater blocking plate 45 is provided to prevent seawater from scattering together with the discharged air and entering the air release pipe 44 through its openings 44'. Thus, the seawater at approximately 40° C. introduced from the seawater intake 46 is heated to approximately 120° C. through heat exchange with the heat-transfer medium. If the heat exchanging pipes 42 have fins formed on the inner wall, further improvement of the efficiency of heat exchange can be expected. While various arrangements of the heat exchange pipes 42 and the air blowing pipe 43 may be thought of, the arrangement should be designed so that the maximum heat exchange efficiency is achieved. Furthermore, the agitation by bubbles may be caused by gas which is not reactive with seawater, such as superheated steam, besides compressed air. If the superheated steam is used, the air release pipe 44 may be eliminated, and the heat of condensation evolved when the superheated steam is changed into water is given to the seawater, so that the use of superheated steam serves to increase the temperature of the seawater.

On the other hand, the heat-transfer medium flowing through the heat exchange pipes 42 is cooled by seawater, releases the heat of condensation and changes into liquid at approximately 120° C., a part of which is fed to the still 6 and the remainder of which is fed to the expansion chamber 3a of the expansion apparatus 3 where the liquid is adiabatically expanded accompanied by reduced pressure and temperature. In this manner, the heat-transfer medium which has been changed into gas at several tens degree is returned to the heat collector 1.

The seawater heated to approximately 120° C. in the heat exchanger 4 is supplied through the seawater outlet to the still 5. Since the vapor pressure in the still 5 is approximately 2 atm. and the pressure within the antipriming pipe 52 is 1 atm., the seawater vigorously boils, releases steam and loses a large amount of heat of vaporization. The boiling of the seawater continues until the temperature and the vapor pressure of the seawater become 100° C. and 1 atm., respectively, and, during boiling, steam continues to be released. The steam collected in the anti-priming pipe 52 within the still 5 is led to the power generating low pressure turbine 11 to rotate the turbine, and then led to the steam condensing heat exchanger 7 where the steam is cooled by the seawater to be fully changed into fresh water, which is led to the freshwater pool 14. The electric generator 12 is rotated by the low pressure turbine 11 to generate electric power. The resulting electric power is utilized as a part of the power source for devices such as the pump used to pump up seawater and an adiabatically compressing compressor. The low pressure turbine 11 may be driven by an appropriate heat transfer medium heated by the above described steam.

The seawater at below 100° C. which flows out from the still 5 is fed to the still 6 where it is heated by the heat-transfer medium at approximately 120° C., and then distilled under reduced pressure by the bleeding ejector 13, decreasing the temperature. In this way, the seawater is distilled in the still 6 until its temperature becomes approximately 60° C., flows out to be fed to the expansion device 3 where the seawater gives heat to the heat-transfer medium to be fed to the next stage or to be discharged outside of the system. The steam leaving from the distilling stage 6 itself changes into fresh water while giving heat to the seawater at the steam condensing heat exchanger 8, a part thereof being supplied to the bleeding ejector 13 and the remainder being stored in the freshwater pool 14. The flow of fresh water is indicated by arrows → in FIG. 1.

Preferably, the still is of multistage type so that steam may be effectively produced from seawater by selecting a different decompressibility for each stage.

While a specific embodiment of the invention has been described, the invention is basically adapted to heat the heat-transfer medium by solar energy, to raise it further through adiabatic compression to high temperatures such as at least 130° C. and preferably 150° to 160° C. or more, and then to distill seawater by heating it to approximately 120° C. through the heat exchange between the high temperature heat-transfer medium and the seawater, and various modifications are possible within the above teachings. Furthermore, in place of solar energy as a heat source for heating the heat-transfer medium in this invention, it is possible to use solar energy indirectly. For example, it is possible to use as a heat source in the nighttime the surface of the earth, rocks and sand thereon which store solar heat in the daytime. Terrestrial heat, oceanic heat, hot industrial waste, the heat caused by the fermentation of microorganisms and cooling fluids of the engine are also available. Furthermore, in the invention, a process may be adopted in which heat collected by a heat-transfer medium such as water, heat-transfer oil for the chemical industry or liquid metals such as mercury is transferred to a heat-transfer medium such as butane or Freon gas, causing the latter medium to heat seawater through a cycle of processes such as adiabatic compression, heat exchange and expansion.

Since, as described above, this invention has been adapted to reheat a heat-transfer medium heated by solar heat to high temperature such as at least 130° C. and preferably 150° to 160° C. or more, and to distill seawater at approximately 120° C. through heat exchange between the high temperature heat-transfer medium and the seawater, it does not need an elaborate structure in comparison with a desalting system utilizing a tracking type of heat collectors, and moreover it can obtain seawater at far higher temperature than by a fixed type of heat collector.

Additionally, in the recent desalination technique, in order to suppress deposition of scale from seawater as much as possible, such a method has been tried as the previous application of a high magnetic field of several thousands gausses to seawater or the removal of salts in seawater causing scale by any appropriate method. The system according to this invention also may increase the maximum temperature of seawater to 120° C. or more by the combination of the above methods and further improve its thermal efficiency.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A desalting system including a heat collecting circuit and a distillation circuit which comprises in combination:
   a solar heat collector provided with a heat collecting pipe therein through which is passed a heat-transfer medium to be heated by solar energy within said heat collector;
   means for adiabatically compressing said solar energy heated heat-transfer medium said heat-transfer medium being directed to said compression means via said heat collecting pipe;
   means for directing said compressed heat-transfer medium to a first heat exchanger into which seawater is introduced for heating said seawater through the exchange of heat between said adiabatically compressed, solar energy heated heat-transfer medium and said seawater;
   means for introducing said seawater into said first heat exchanger;
   means for directing said heat-transfer medium, after passing through said first heat exchanger, to a means for adiabatically expanding said heat-transfer medium and for returning said adiabatically expanded heat-transfer medium to said solar heat collector;
   means for directing said heated seawater to at least one evaporation means for collecting and separating steam produced from said seawater;
   means for directing said steam to at least one additional heat exchanger for condensing said steam into fresh water; and
   means for collecting and storing said fresh water.

2. A desalting system as set forth in claim 1, further including means for supplying gas to said seawater within said first heat exchanger for the purpose of agitating said seawater so as to enhance the heat-exchange efficiency of said first heat exchanger.

3. A desalting system as set forth in claim 1, wherein at least one of said evaporation means comprises a bleeding ejector for decompressing the interior of said respective evaporator.

4. A desalting system as set forth in claim 1, in which said heat-transfer medium is Freon gas.

5. A desalting system as set forth in claim 1, in which said heat-transfer medium is alcohol.

* * * * *